May 18, 1926.
D. M. SIMONS
CABLE JOINT
Filed Sept. 18, 1924
1,585,124
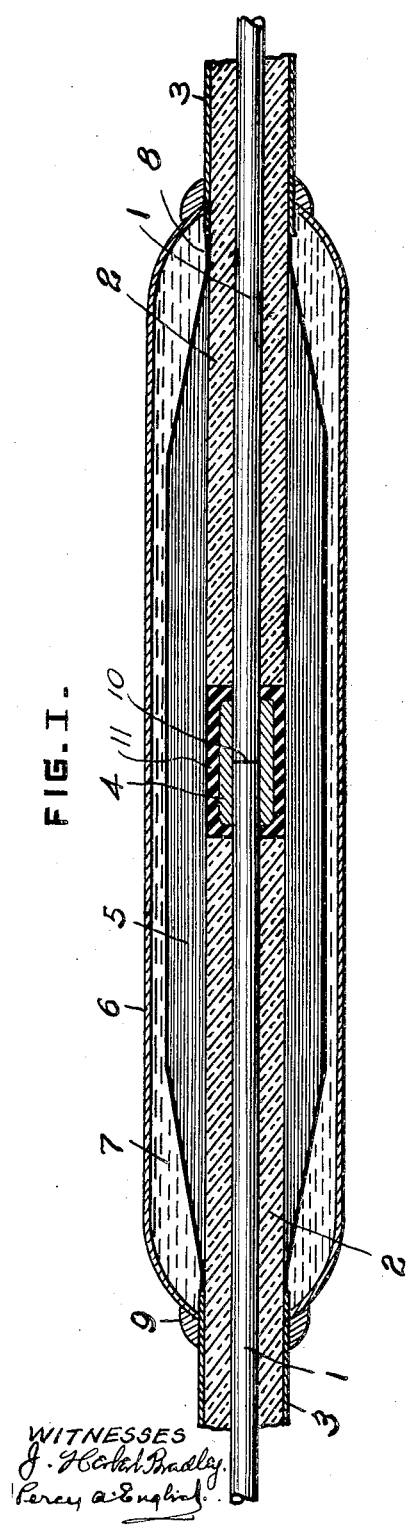
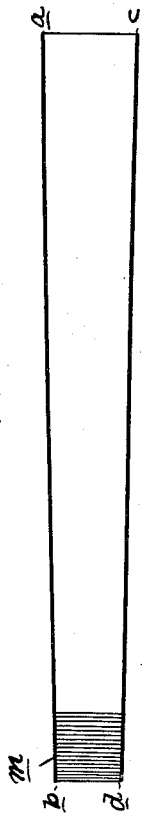
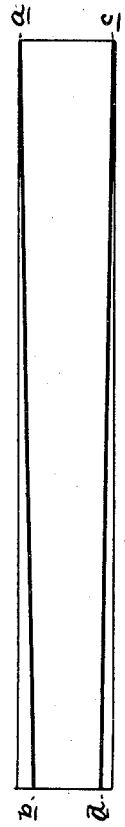
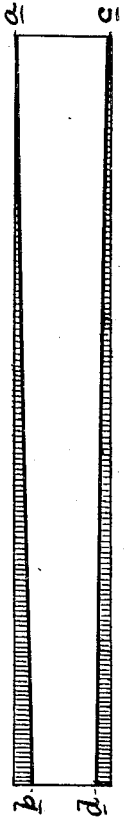
INVENTOR
Donald M. Simons
by Christy and Christy
his attorneys
WITNESSES Patented May 18, 1926.

1,585,124

UNITED STATES PATENT OFFICE.

DONALD M. SIMONS, OF OSBORNE, PENNSYLVANIA, ASSIGNOR TO STANDARD UNDERGROUND CABLE COMPANY, OF PITTSBURGH, PENNSYLVANIA, A CORPORATION OF PENNSYLVANIA.

CABLE JOINT.

Application filed September 18, 1924. Serial No. 738,424.

My invention relates to improvements in the structure of joints for electric cables, and it becomes valuable in the joints of cables to be used in high-voltage work particularly.

The art of joint making in electric cable installations has advanced, as the electric cable art has advanced into the field of high-voltage transmission. When voltages were low, it was sufficient merely to uncover and then electrically to unite the ends of the conductors of two lengths of cable, and, having done this, to insulate the union and cover the whole with a metallic sleeve which, united at its ends to the opposite cut-away ends of the cable-sheath, was effective to shut out moisture. As voltage increased it was found that the square-cut ends of the cable-sheath were places of concentration of stress, and were, therefore, in the finished joint, places of weakness. A correction of this difficulty, adequate in some degree, was found in belling out slightly the cut-off ends of the lead sheath. With further increase of voltage, which came with the larger and larger demands of the industry, this belling of the ends of the cable-sheath was found to be insufficient, and then the further expedient was resorted to of shaping the enclosing sleeve of metal with long gradual taper at its two ends, and of so uniting the ends of the cable-sheath with the sleeve as to cause the inner surfaces of the cable-sheath to merge in the taper of the ends of the joint-sleeve. This, too, was an advance, improving the joint for heavy work, but still leaving it insufficient to the still increasing demands.

The space within the joint-sleeve and surrounding the union was filled with insulating compound, liquid or viscid in nature. This essentially liquid insulation, overlying the machine-laid insulation of the cable proper, adjacent the point of union of the conductor ends, and particularly that portion of the body of liquid insulation which filled the tapered ends of the joint-sleeve was found to be peculiarly liable to breakdown. It was discovered that this was due to two circumstances or conditions. One of these is that the specific break-down strength of liquid insulation decreases rapidly with the thickness of the dielectric layer, and, the other is that this liquid dielectric, subject to the tendency just stated, and associated as it is with an envlope of machine-laid insulation which surrounding the conductor underlies it, tends (because of the relative specific inductive capacities of the materials chosen) to take more than its proportionate share of the voltage strain.

The proposal then was made, to fill the tapering spaces within the ends of the joint-sleeve and surrounding the bodies of machine-laid insulation, with bodies of solid insulation, excluding from that portion of the joint as completely as possible, free liquid insulation. This proposal, however, was attended with great practical difficulties, and when it came to making installation in the field (an inescapable circumstance), highly successful achievement was practically impossible. Between the two bodies of insulation here particularly spoken of, it will be understood the body of insulation to cover the joint itself had to be applied.

The next step in the progress consisted in applying to the united cable ends within the sleeve of the joint, and immediately overlying the adjacent ends of machine-laid insulation, a newly-applied body of wrapped-on insulation, this newly-applied body being at its ends tapered, and, in coating with metal the tapered ends of this body. The metal coating was made electrically continuous with the cut-away ends of the cable-sheath. When this body of solid insulation had been applied, the remainder of the space within the sleeve was filled with free liquid insulating compound. Thus the regions within the tapered ends of the sleeve, the regions otherwise peculiarly liable to break-down were protected; the intermediate portion of the wrapped-on body of insulation, however, where stresses are distributed, was left without special provision.

The difficulties with the joint improved in those details last mentioned are manufacturing difficulties. It will be understood (as has already been intimated) that the joint under consideration has to be built in the field, and it will be apparent that this condition is very unfavorable to the successful performance of work of a very exacting nature. Furthermore, the work at best is of necessity very slowly and laboriously performed.

In the ensuing description of my invention I shall refer to the accompanying drawings, in which, in Fig. I a cable joint embodying my invention is diagrammatically illustrated in medial and longitudinal section. Figs. II, III, and IV illustrate diagrammatically various ways of preparing a sheet of insulating material for use in the practice of my invention.

Referring to Fig. I of the drawings, 1 indicates the conductors of two cable lengths, united at the point 10. 2 is the machine-laid insulation of the cable lengths, and this machine-laid insulation is, as will be perceived, cut away for a short distance, exposing the conductors at their ends, where their electrical union is effected. 3 is the lead sheath of the cable lengths, and it is cut away, as the drawings show, for greater distances from the exposed ends of the conductor, and appreciable lengths of the machine-laid insulation are exposed.

In making the union between the ends of conductors 1, the entire space between the cut off ends of the bodies 2 of machine-laid insulation may be filled and occupied with an annulus of conducting material, but ordinarily an annulus 4 of suitable conducting material is sweated upon the two ends of the conductors brought together within it, as at 10, and then insulation, ordinarily in the form of paper tape, is wrapped upon the union, and with this wrapped-on insulation the entire space is filled out between the cut-off ends of the bodies 2 of machine-laid insulation, as indicated at 11. Thus a continuous cylindrical body extends between the cut-away ends of the lead sheath 3, and it is this region which is to be protected against break-down when the cable in service is carrying high-voltage current.

My invention consists in surrounding this cylindrical body of insulated conductor with a wrapped-on body 5 of sheet insulation so prepared as to be applicable under field conditions with expedition and accuracy; and, in including in the wrapped-on body a wrapped-on screen of metal. Preferably, and as a matter of further invention, I so preliminarily prepare the sheet of insulation from which the body 5 is formed that, when it has been wrapped on and the body 5 has been built, the body will include a metallic screen which, when brought into electric continuity with the ends of the cable-sheath, will limit dielectric stress (particularly within the tapered end portions) within the outer surface of the body 5. The essentially liquid insulation which in the finished joint fills the space 7 will not, when the cable is in service, be under stress nor subject to break-down, particularly in the tapered end portions of the joint.

The insulating material in sheet form may be specifically such as is preferred,—paper, varnished cloth, and the like,—but preferably I employ paper impregnated with insulating compound. This material is well-known to the art. The body 5 built of it is, electrically considered, a body of solid insulation, and is free of those disadvantageous characteristics of liquid insulation which have been mentioned above.

I employ a single sheet of such material, that is to say, a sheet of such width that in its application it forms the body 5 in a single wrap. It may be formed longitudinally in sections, though preferably it is continuous from end to end.

Such a single sheet of paper, adapted for the achievement of my invention is shown in plan in Fig. II. The scale will be understood to be less than the scale of Fig. I, and it will be understood further that the showing is diagrammatic, particularly in that the ratio of length to width is in this drawing not worked out to meet practical conditions. The single sheet is of such dimensions that it may be wrapped upon the cylindrical body of machine-laid insulation and over the union of conductors prepared as I have already described, and, when so applied, may itself constitute the body indicated at 5, Fig. I. The sheet is tapered in either straight lines, or with any slight curvature desired, and by virtue of its taper affords in the finished article the tapered-ended body 5 of insulation.

The body 5 so built contains a wrapped-on screen of metal electrically continuous with the ends 3 of the cable-sheath. Preferably the paper sheet from which the body 5 is formed is so preliminarily prepared that, when applied, the ends of the body 5 will present a gradually flaring screen of conducting material. And this screen of conducting material, being brought into electrical continuity with the cable-sheath, will protect against break-down, in the manner indicated. The tapered sheet of insulation of Fig. II, before its application to form the body 5, is metalized at the edges a—b and c—d. This metallizing is preferably done on both sides and across the very edge of the sheet, and the metallized margin is of sufficient width, so that when the sheet has been wrapped on, the metal of the successive turns will overlap, and form in effect a continuous, substantially funnel-shaped metallic screen conforming to the surface of the tapered ends of the body 5 as seen in Fig. I. It is not, however, necessary that this margin of metal be formed on both sides of the sheet, nor is it necessary that when wrapped on there be overlapping and actual contact of metal upon metal in the successive turns, for, even without such overlapping contact, the metal in the assembled article will at least assume the form of a flaring spiral, and this spiral will be effective to accomplish the same results. However, it will of course be understood that, in such case, the applied metal must be heavy enough to serve in this particularly attenuated shape as one of the two opposing plates (the cable conductor being the other plate) of what is, in effect, a condenser.

Instead of providing a sheet which is tapering, as shown in Fig. II, I may provide a sheet such as those shown in Figs. III and IV, which are not tapering at all, but are of uniform width from end to end, and I may apply to such a sheet, and along the converging lines $a$—$b$ and $c$—$d$ of Fig. III, which may be straight or slightly curved, a similar attenuated body of conducting material. The conducting material so applied may be applied to one side only or to both sides, and if applied to both sides, the two applications may be rendered electrically one by causing them to penetrate perforations formed through the sheet along the lines $a$—$b$ and $c$—$d$.

Again in Fig. IV, I show a sheet which, like the sheet shown in Fig. III, is not tapered but is, indeed, of uniform width throughout, and in which, from the lines $a$—$b$ and $c$—$d$, outward to the edge, the sheet is metallized. This metallizing may be upon one face or upon both faces.

The application of metal to the sheet material may be variously accomplished. The metal may be applied in the form of paint, or it may be sprayed on, or again it may be applied in the form of foil, and if in the form of foil, it may (with Figs. II—IV in mind) constitute an inlay in a sheet minutely shaped to receive such an inlay, and so the sheet may after the application of metal has been made be uniform in thickness from edge to edge. That is to say, the sheet may be made multiple-ply, and certain of the plies of which the sheet is composed may be cut, so that in the assembly of plies the inlay of metal foil will form with the cut portions of the plies, continuous layers in the compound sheet.

The metallic flaring body so formed is at either end united electrically to the lead sheath 3 of the cable in any suitable way, as by means of a foil wrapping 8.

It will thus be seen that in the finished article the conductor is surrounded within the sleeve of the joint by a body of solid insulation which at its ends supports a flaring screen of conducting material which is electrically continuous with the cable sheath. As particularly illustrated in Fig. I, this screen underlies the reduced ends of the sleeve 6 of the joint. The space 7 then may be filled with insulating compound, and in service this compound will not be under dielectric strain.

Additionally, the strip may at the end be metallized for a proper distance, as indicated at $m$, Fig. II, so that when applied the body 5 will, throughout its whole extent, be virtually metal surfaced, and thus at every point from one end of the joint to the other the liquid insulation which fills the space 7 is free of stress.

In the practice of my invention then the body of insulation 5 carries at either end flaring screens of metal which in assembly are made electrically continuous with the cut-away ends of the cable-sheath. The intermediate cylindrical portion of the body 5 may or may not carry superficially a metal screen. I have described one way of providing such a screen upon the intermediate cylindrical portion of the body 5. By way of alternative, while the flaring screens of the end portions of body 5 may be provided by localized metallization of the strip of which the body 5 is essentially formed, the screen for the intermediate and cylindrical portion of body 5 may be applied after the body 5 has otherwise been built, as by wrapping this portion of the body 5 in metal foil. Such screen of the intermediate portion of the body 5 may be brought into immediate continuity with the flaring screens of the end portions of the body 5; and additionally, it may be grounded immediately to the surrounding joint-sleeve 6.

In making application the usual procedure is followed. The sleeve 6 is slipped over the end of one of the two lengths of cable which are to be joined. The ends of the cable lengths having been prepared, the conductors 1 are first united, and as ordinarily will be the case, insulation is wrapped over the union 4 to fill the space between the cut-away ends of the bodies 2 of machine-laid insulation. The strip of material described above, having previously been prepared, then is wrapped to form the body 5. The foil wrapping 8 is then applied, to afford electrical continuity between the ends 3 of the cable-sheath and the metallic screen constituted by the metallized surfaces of the wrapped-on sheet which forms the body 5. When this has been done, the sleeve 6 is brought to position. Its ends are shaped, so far as may be necessary, to bring them adjacent to the surfaces of the ends 3 of the cable-sheath, and the wiped solder joints 9 are then made. The space 7 within the sleeve and between the body 5 of insulation and the sleeve, is then filled with insulating compound. The filling openings are closed, and the joint is ready for service.

It will be understood without particular illustration that the invention which I have described may be applied separately to each of the conductors of a multiple-conductor cable, and the whole included within a common joint casing. It will also be apparent that the invention lends itself to the enjoyment of the invention of Letters Patent No. 1,199,789, granted October 3, 1916, on the application of Martin Hochstadter, and that the metallic screen upon the body 5 of my improved joint may be made electrically continuous with the foil integument provided by Hochstadter upon the insulated conductor and beneath the cable-sheath.

As compared with the building of the joints known to the prior art, my invention may be practiced with the achievement of a joint in no respect inferior, but of highest excellence, electrically considered; and, in addition to that, the operation of joint-building is simplified, and may be performed in the field in adequate manner and with large saving in time and labor.

I claim as my invention:

1. A cable joint including a body of wrapped-on insulating material formed of a single sheet metallized adjacent its opposite margins and surrounding the united conductor-ends and the adjacent ends of machine-laid insulation, such metallized margins constituting flaring screens made electrically continuous with the cut-away ends of the cable-sheath, said joint further including a sleeve surrounding the said body of insulation and at its ends secured to the cable-sheath on each side of the joint, the space within the sleeve and surrounding the said wrapped-on body being filled with insulating compound.

2. A joint for an insulated metal sheathed cable including, in combination with the united conductor ends, a wrapped-on body composed of insulating and of conducting material, the insulating material carrying the conducting material intercalated between its successive turns and the conducting material extending in continuity from turn to turn of the insulating material, and the conducting material so carried constituting two screens arranged one at either end of said wrapped-on body and each in electric continuity with the cable-sheath on each side of the joint, a sleeve enclosing the whole and united on each side to the cable-sheath, and a body of liquid insulation filling the sleeve externally of said body of insulation.

3. A wrapping for a cable joint consisting of a sheet of insulating material metallized adjacent its opposite edges along convergent lines.

4. A wrapping for a cable joint consisting of a tapered sheet of insulating material metallized along its opposite convergent edges.

In testimony whereof I have hereunto set my hand.

DONALD M. SIMONS.